United States Patent [19]
Kushner

[11] 3,738,022
[45] June 12, 1973

[54] MULTI-WINDOW TEACHING DEVICE
[76] Inventor: Bernard N. Kushner, 370 Central Park Avenue, Scarsdale, N.Y. 10583
[22] Filed: Aug. 5, 1971
[21] Appl. No.: 169,445

[52] U.S. Cl. ............................................. 35/9 R
[51] Int. Cl. ........................................... G09b 3/02
[58] Field of Search ................... 35/9 R, 9 E, 30, 35/31 B, 31 C, 31 F; 273/155

[56] References Cited
UNITED STATES PATENTS
840,144    1/1907    Lincoln .............................. 35/9 R
2,460,563  2/1949    Zelvin ................................ 273/155
2,911,742  11/1949   Shimrat ............................. 35/9 R
3,332,156  7/1967    Reeves ................................ 35/30
3,355,821  12/1967   Buenger .............................. 35/30

*Primary Examiner*—Wm. H. Grieb
*Attorney*—David R. Treacy

[57] ABSTRACT

A teaching device having multiple windows through which symbols are displayed, a display of identification words or marks related to individual ones of the symbols, and an actuating device for selecting a desired identification word. Moving the actuating device closes the windows in front of the unrelated symbols.

8 Claims, 11 Drawing Figures

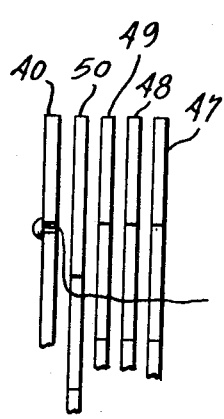
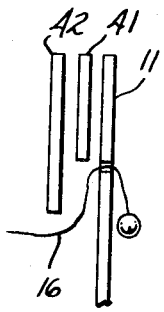
FIG. 6A
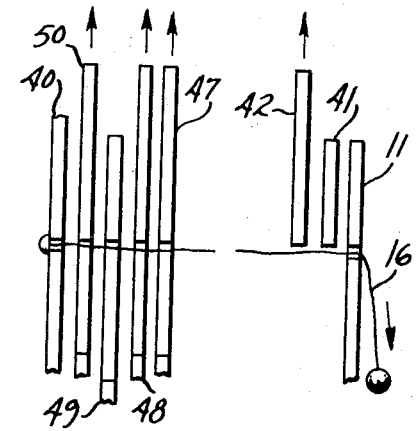
FIG. 6B
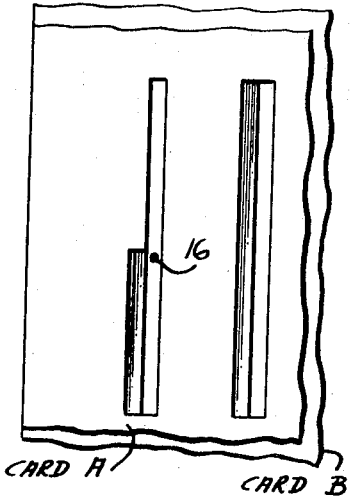
FIG. 7A
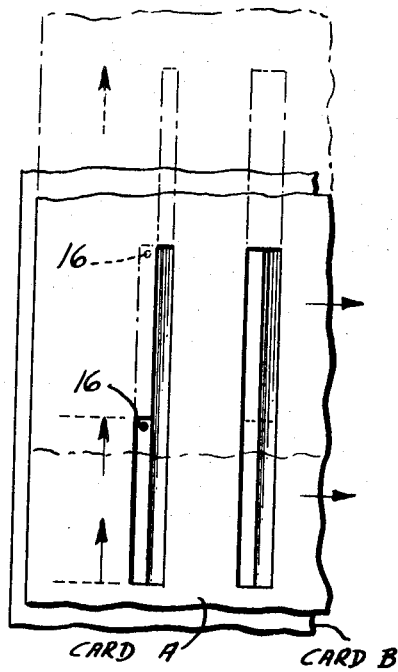
FIG. 7B

MULTI-WINDOW TEACHING DEVICE

BACKGROUND OF THE INVENTION

1. Field of the Invention

This invention relates to games and teaching devices used to teach or reinforce the learning of the association between words, figures, symbols and pictures. In particular it is concerned with the provision of aids to self-teaching, in which a child or student can pick an answer and then readily find out by himself if it is correct.

2. Description of the Prior Art

Self-teaching games have been known for many years. In one form, a list of questions and a list of answers are placed on a device having pushbutton switches aligned along each list. Simultaneous pressing the button beside the question and that beside the right answer causes a buzzer to sound, or a light to glow. Various expedients have been attempted to provide variation in the patterns used, so the student doesn't learn simply the relative button locations that are associated with each other.

SUMMARY OF THE INVENTION

In accordance with the invention, a multi-window teaching device is provided, wherein an actuating button adjacent to the chosen answer or question is moved, thereby moving a set of aperture cards through whose windows the array of possible answers is viewed. The arrangement of the apertures in the cards causes the windows to "close" over all the answers save the correct one related to the button that was moved. It has also been discovered that the number of cards required to display a large number of different responses can be reduced, rather than using one card per actuator, by using an interrelated network of apertures in the cards, and moving a different combination of two or more cards with each actuator.

In another aspect of the invention, one or more additional aperture cards are provided, which can be separately controlled to move in response to different ones of the actuator buttons, thereby changing the geometric relationship seen by the eye between the actuator moved and the window through which the related picture or symbol is viewed.

BRIEF DESCRIPTION OF THE DRAWING

FIG. 5 is a partial front view of the release card shown in FIG. 2.

FIGS. 6a and 6b are side views in section showing the actuator string of the device of FIG. 1.

FIGS. 7a and 7b are front views in section showing the actuator string position in the selector slots of the device of FIG. 1.

DETAILED DESCRIPTION

Figure 1:
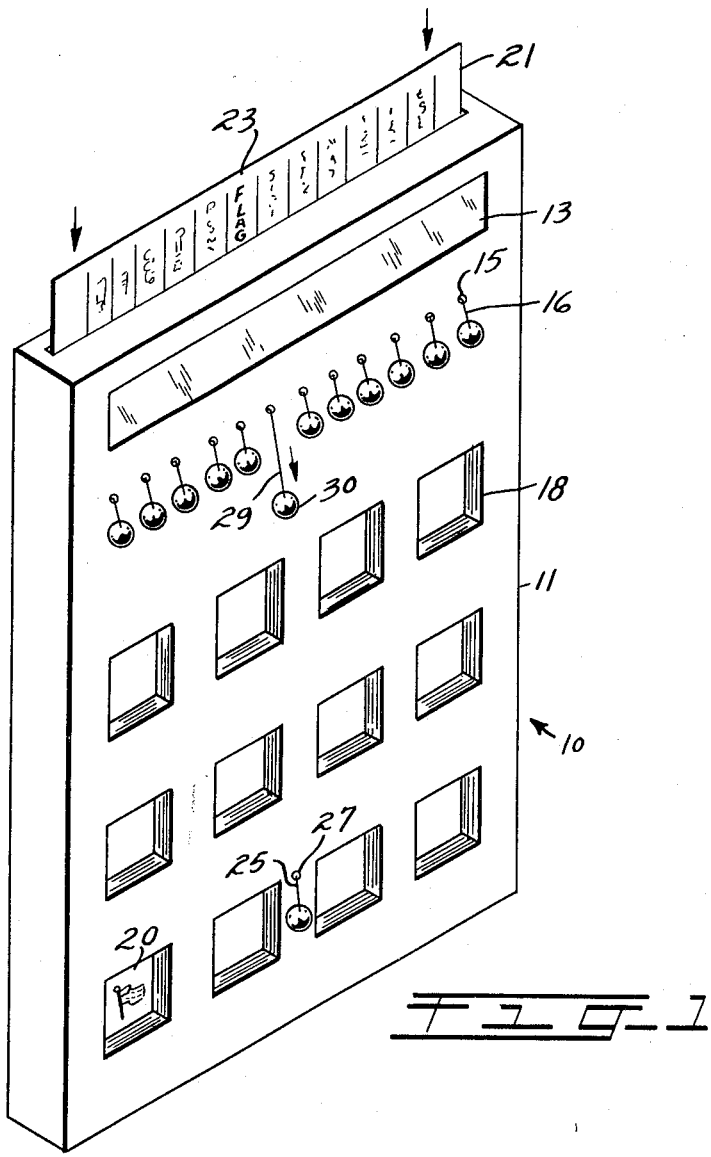
FIG. 1 is a perspective view of a multi-window teaching device embodying the invention.

Referring to FIG. 1 there is shown a teaching device which provides variable question-answer patterns and yet can be constructed simply and inexpensively. A frame 10 has a front cover plate 11 containing an identification word viewing port 13 across its upper part, a row of holes 15 horizontally arranged below the port for actuator strings 16. A matrix pattern of windows 18 is arranged below the string holes 15, through which windows can be seen one of the symbols 20, a picture of a flag, which are depicted on the picture panel 21, which is shown raised above its inserted position so that the row of identification words 23 shows clearly. The cancel string 25 is shown in the withdrawn position, hanging from the hole 27 in the front plate 11. The sixth actuator string 29 with its pulling bead 30 is shown in the pulled position, corresponding to the viewing of the flag 20 in one of the windows 18.

Figure 2:
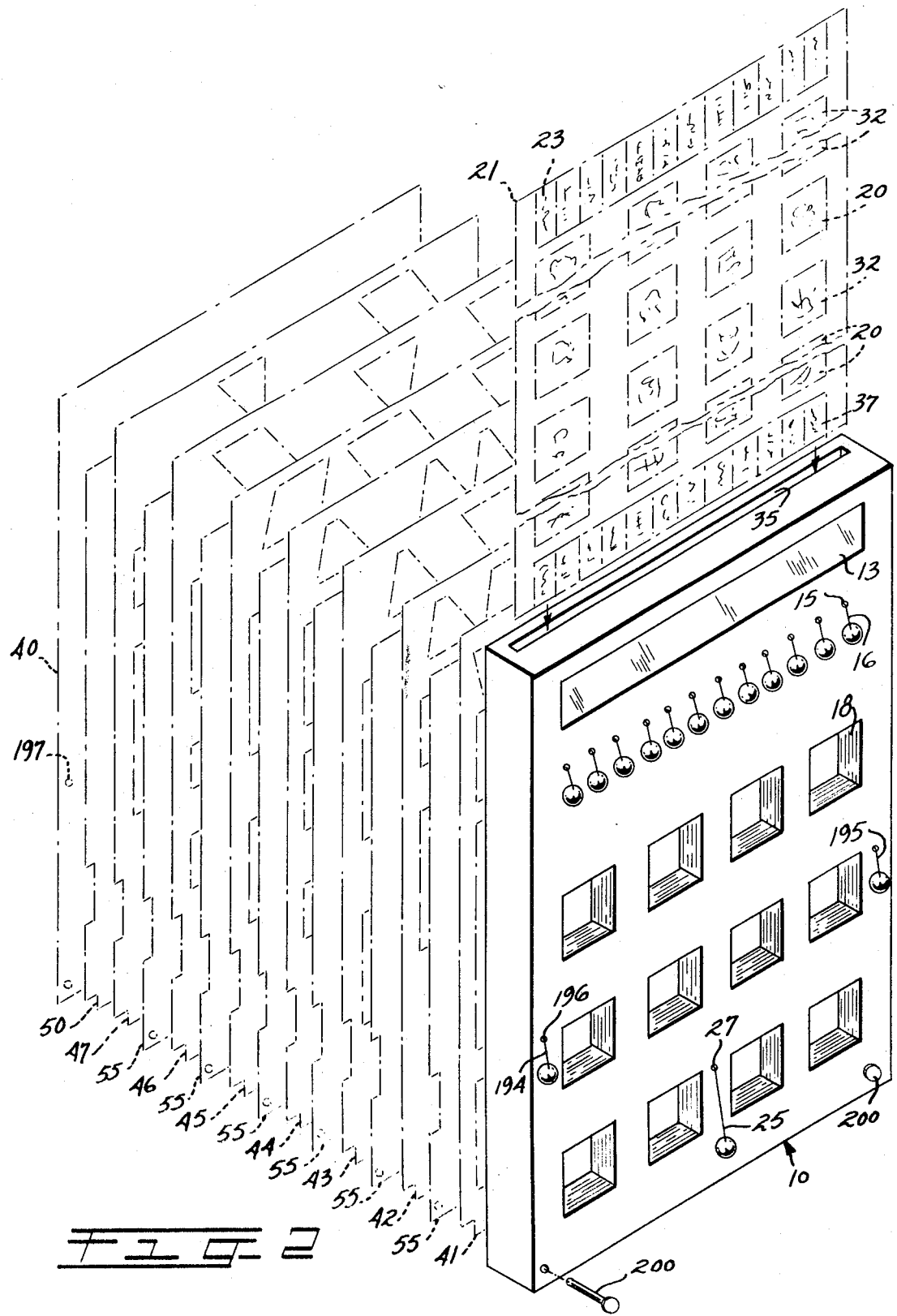
FIG. 2 is an exploded perspective view of the device of FIG. 1.

Referring to FIG. 2, the various cards and separators are shown in the relative order of their placement in the frame 10. The picture panel 21 is made preferably with two sets of symbols 20 and 32, so spaced on the panel that the set 20 can be viewed with the panel in the orientation shown, while the set 32 will be upright and in line with the windows 18 when the panel is inverted from the position shown and inserted through the slot 35 in the top of the frame 10 and pushed all the way down. In that inverted position, the identification words 37 would be at the apparent top of the panel 21, available for viewing through the port 13, while in the orientation shown the identification words 23 will be visible through the port.

The cards and separators shown generally in FIG. 2 are assembled between the rear main aperture plate 40 and the front cover 11, with a guide (not shown) behind the rear plate 40 for holding the picture panel 21 in position. The rear plate 40 also includes transparent window openings (not shown) aligned with the windows 18 in the front cover 11, and openings to receive the actuator strings 16 as shown in FIGS. 6a and 6b. The order of assembly of the cards shown includes aperture cards 41, 42, 43, 44 and 45, selector cards 46, 47, 48 and 49, release card 50, (cards 48 and 49 not shown in FIG. 2 for clarity) with a separator 55 between each of the cards.

Figure 3:
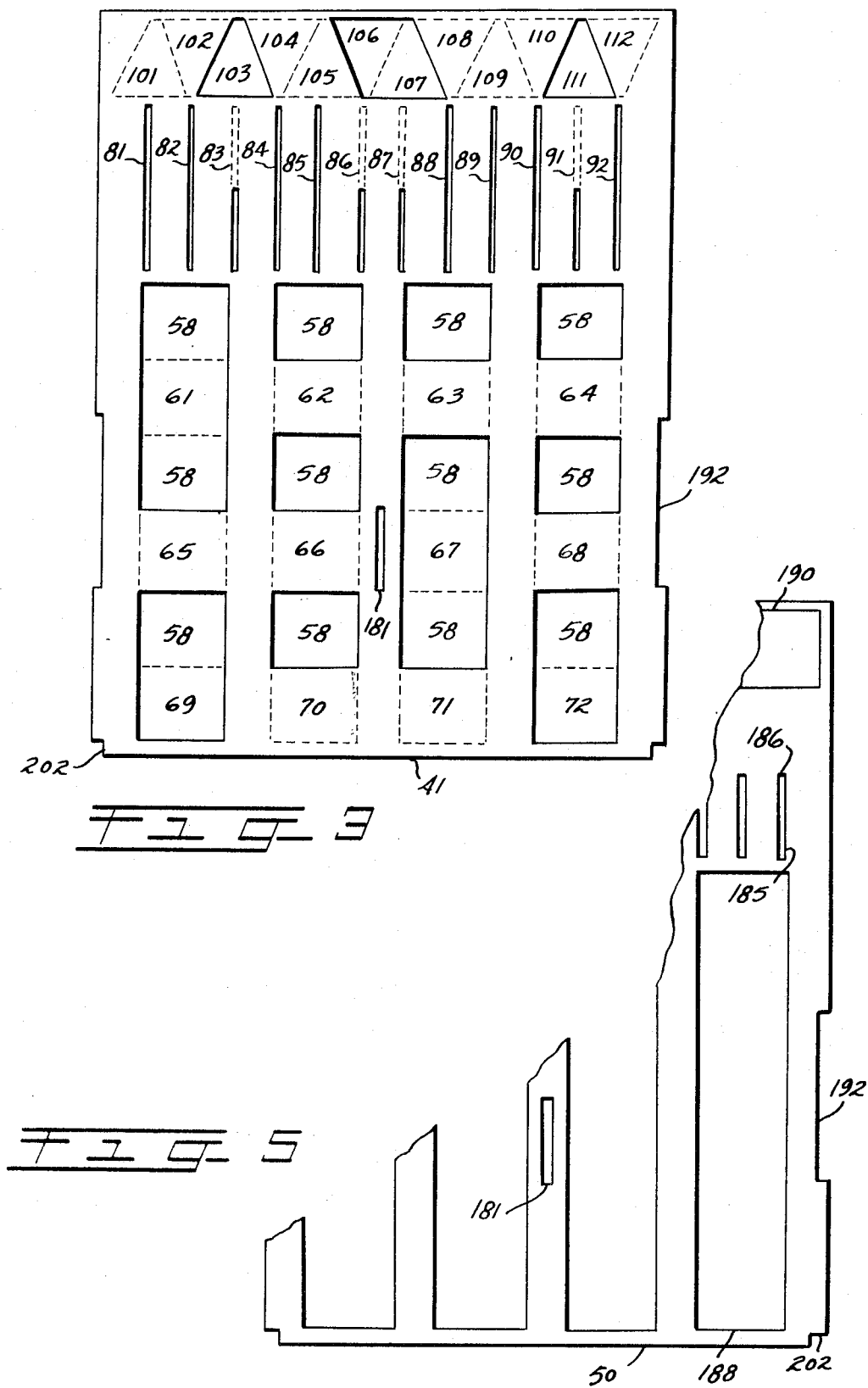
FIG. 3 is a front view of one of the aperture cards shown in FIG. 2.

Referring to FIG. 3, aperture card 41 is shown, with dashed lines indicating the outlines of openings made in one or more of cards 42, 43, 44 or 45. Window positions 58 are in line with the windows 18 in the front plate 11, shown in FIG. 2, when the card 41' is slid downwards in the frame 10 to its lowest extent, or first position. When the card 41 is raised to its upper, or second position, by means to be described below, windows 61, 67, 69 and 72 are aligned with corresponding ones of the windows 18, while the other opaque areas 62, 63, 64, 65, 66, 68, 70, and 71 are aligned with the balance of the windows 18. A series of actuating slots 81 – 92 are also formed in the card 41. These slots are vertically aligned with corresponding holes 15 in the front plate 11, shown in FIG. 2, when the card is in the frame. When the card is in the lowest, or first position, the top ends of slots 81, 82, 84, 85, 88, 89, 90, and 92 are aligned with the top edge of the corresponding hole 15; when the card 41 is in its upper, or second position, the top edge of slots 83, 86, 87, and 91 are aligned with the top edge of their corresponding holes 15. The bottom edge of all the slots 81 – 92 is below the bottom edge of the corresponding hole 15, when the card 41 is in its upper position, by a distance equal to the distance between the upper and lower positions.

Near the top edge of the card 41 a number of identification word viewing ports 103, 106, 107, and 111 are located, such that when the card is raised to its upper position, these ports are aligned with corresponding ones of the identification words 23 on the picture panel 21, shown in FIG. 2, when that panel is inserted in its normal position in the frame 10. In this embodiment the ports 103 and 111 are shown as triangles so as to provide a maximum space for viewing pictures or words that may be located in the identification word position, but other shapes may be used satisfactorily with appropriate identification marks. Opaque areas 101, etc. are located to hide from view corresponding identification words when the card 41 is raised. Cards 42, 43, 44 and 45 are similar to card 41, but have open or closed windows 61 – 72, long or short actuating slots 81 – 92, and open or closed viewing ports 101 – 112 in according to the following table, in which the mark X indicates a closed window or port or a closed upper half of the slot.

| Card | Window | | | | | | | | | | | |
|---|---|---|---|---|---|---|---|---|---|---|---|---|
| | 61 | 62 | 63 | 64 | 65 | 66 | 67 | 68 | 69 | 70 | 71 | 72 |
| 41 | O | X | X | X | X | X | O | X | O | X | X | O |
| 42 | O | X | X | O | O | O | X | X | X | O | X | X |
| 43 | X | O | O | O | X | X | X | O | X | O | O | X |
| 44 | X | O | X | X | X | X | X | O | O | X | O | O |
| 45 | X | X | O | X | O | O | X | O | X | X | X | X |

| Card | Actuating slot | | | | | | | | | | | |
|---|---|---|---|---|---|---|---|---|---|---|---|---|
| | 81 | 82 | 83 | 84 | 85 | 86 | 87 | 88 | 89 | 90 | 91 | 92 |
| 41 | O | O | X | O | O | X | O | O | O | O | O | O |
| 42 | X | O | O | O | X | O | X | O | X | O | X | X |
| 43 | X | X | O | X | O | O | O | X | O | X | O | O |
| 44 | O | X | X | O | O | X | O | O | O | X | O | O |
| 45 | O | O | O | X | O | O | O | X | X | O | O | X |

| Card | Identification port | | | | | | | | | | | |
|---|---|---|---|---|---|---|---|---|---|---|---|---|
| | 101 | 102 | 103 | 104 | 105 | 106 | 107 | 108 | 109 | 110 | 111 | 112 |
| 41 | X | X | O | X | X | O | O | X | X | X | O | X |
| 42 | O | X | X | X | O | X | O | X | O | X | O | O |
| 43 | O | O | X | O | O | X | O | X | O | X | X | O |
| 44 | X | O | O | X | O | X | X | X | O | X | X | X |
| 45 | X | X | X | O | X | X | O | O | X | X | X | O |

A comparison of the various openings in the cards 41 – 45 defined in the above table shows that for each particular actuating slot position, a respective pair of aperture cards have a closed upper half of the slot; also, the same pair of aperture cards have closed upper-half slots corresponding to one other actuating slot position. For example, cards 41 and 44 have closed upper halves for slots 83 and 86. Each such pair of aperture cards provides a closed window at ten of the position 61 – 72, designated by a mark X for one card or the other or both, except for two window positions uniquely associated with that pair of aperture cards; for example, windows 69 and 72 are the only windows open both on card 41 and card 44.

Variations in the pattern of geometric relation between each actuator string and its corresponding correct answer window by the use of selector cards 46 – 49 which can be moved into either of two states by means to be described below. Each state causes the closing of a different one of the two open window positions corresponding to each actuator slot position; for the example given above, in one state it would be desired that an open window at position 69 would correspond to actuator slot 85, and an open window at position 72 would correspond to slot 83; in the other state, this relationship would be reversed.

Figure 4:
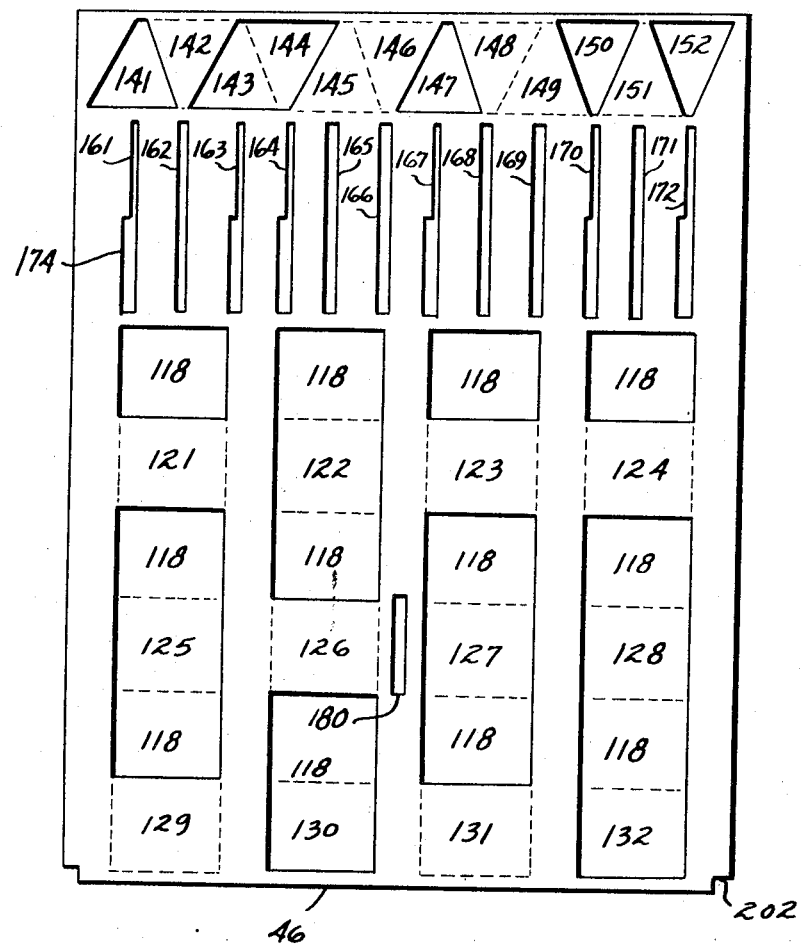
FIG. 4 is a front view of one of the selector cards shown in FIG. 2.

Referring now to FIG. 4, selector card 46 is shown. The selector cards 46 – 49 are slightly narrower than the aperture cards 41 – 52, so that the selector cards may be adjusted sideways into either of two positions, or states, whereby the raising of a selector card to its upper, or second, position is a function of the state of the card as well as the choice of actuator string 16 which is pulled.

As shown in FIG. 4, the card 46 has windows 118 in positions corresponding to the windows 58 of the aperture cards, except that the windows 118 are slightly wider than the windows 58, on account of the sideways adjustment described above. Selector cards 46 – 49 also have window positions variously located below corresponding windows 118, analogous to the windows 61 – 72 of the aperture cards, which window positions 121 – 132 are open or closed according to the table following.

| Card | Window | | | | | | | | | | | |
|---|---|---|---|---|---|---|---|---|---|---|---|---|
| | 121 | 122 | 123 | 124 | 125 | 126 | 127 | 128 | 129 | 130 | 131 | 132 |
| 46 | X | O | X | X | O | X | O | O | X | O | X | O |
| 47 | O | X | O | O | X | O | X | X | O | X | O | X |
| 48 | X | O | X | X | O | X | O | O | X | O | X | O |
| 49 | O | X | O | O | X | O | X | X | O | X | O | X |

The selector cards 46 – 49 also have identification word viewing ports 141 – 152 which are variously open or opaque on the four cards, similarly positioned to the corresponding ports 101 – 112 of the aperture cards, but made slightly wider in the same fashion as the windows 121 – 132. The ports 141 – 152 are open or closed in accordance with the following table.

| Card | Identification port | | | | | | | | | | | |
|---|---|---|---|---|---|---|---|---|---|---|---|---|
| | 141 | 142 | 143 | 144 | 145 | 146 | 147 | 148 | 149 | 150 | 151 | 152 |
| 46 | O | X | O | O | X | X | O | X | X | O | X | O |
| 47 | X | O | X | X | O | O | X | O | O | X | O | X |
| 48 | X | O | X | X | O | O | X | O | O | X | O | X |
| 49 | O | X | O | O | X | X | O | X | X | O | X | O |

The selector cards 46 – 49 also have selector slots 161 – 172 located similarly to the actuating slots 81 – 92 of the aperture cards 41 – 52. The lower half 174 of each selector slot is slightly wider than the corresponding actuating slots by an amount approximately equal to the side motion of adjusting a selector card from one state to the other. The upper portion of each selector slot has its top edge at a height similar to the actuating slots, but is of one of three types as tabulated below. A mark "O" in the table indicates a top portion of the same width as the bottom portion 174; A mark "L" indicates that, as viewed from the front, the left half of what would be open in an "O" slot is solid, the bottom edge of the solid area being at the same height as the top edge of the short actuating slots 81 – 92, so that an actuating string 16 may bear against the bottom edge of the solid area when the card is adjusted to the right; as shown in FIG. 7a and 7b; and a mark "R" indicates a selector slot whose upper half is solid at the right.

| Card | Selector slot | | | | | | | | | | | |
|---|---|---|---|---|---|---|---|---|---|---|---|---|
| | 161 | 162 | 163 | 164 | 165 | 166 | 167 | 168 | 169 | 170 | 171 | 172 |
| 46 | L | O | L | L | O | O | L | O | O | L | O | L |
| 47 | O | L | O | O | L | L | O | L | L | O | L | O |
| 48 | O | R | O | O | R | R | O | R | R | O | R | O |
| 49 | R | O | R | R | O | O | R | O | O | R | O | R |

Figure 8A:
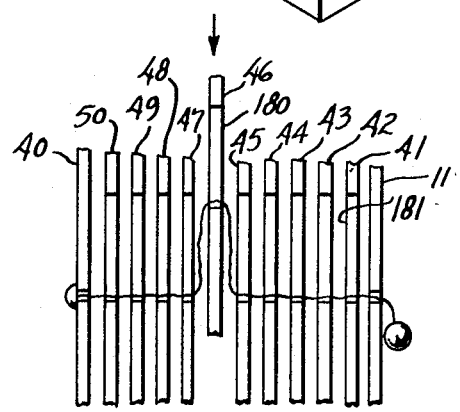
FIGS. 8a and 8b are side views in section showing the cancel string of the device of FIG. 1.
Figure 8B:
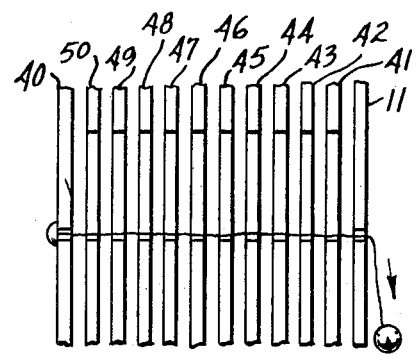

The selector cards 46 – 49 also have cancel slots 180 located in alignment with the hole 27 in the front cover plate shown in FIGS. 1 and 2, when the cards are in place in the frame 10. When the selector card 46 is in its lowest position, the bottom edge of the slot 180 is aligned with the bottom edge of hole 27 and the opening in the rear main aperture plate 40 for receiving the cancel strings 25; as shown in FIG. 8b. As shown in FIG. 8a, when a selector card, e.g. 46, is in its highest position, the lower edge of the slot 180 is slightly below the top edge of corresponding slots of selector cards which are in their lowest positions.

As shown in FIGS. 3 and 8a and 8b, cancel slots 181 are located in each of the aperture cards 41 – 45, identical to the slots 180 except that the width will be narrower since the cards 41 – 45 do not move sideways.

Referring to FIG. 5, there is shown a release card having the same external dimensions as an aperture card 41. The release card 50 has actuating slots 185 located in alignment with the short actuating slots 81 – 92 in the aperture cards, except that the top edge 186 of the slots 185 are slightly lower than the lower edges of the solid areas of the "L" and "R" type selector slots 161 – 172 in the selector cards 46 – 49, when the cards are in the lowest or first position, as shown in FIG. 6a. This arrangement prevents an actuator string 16 from catching on the edge of the solid area in a selector slot when the selector card is being adjusted from one state to the other, as described below. The release card 50 also has full length windows 188 which present an open area in line with the windows 18 of the front cover for all present of the release card. An identification word viewing port 190 the same size as the viewing port 13 in the front cover is also provided. A cancel slot 181 in alignment with those of the aperture cards returns the release card to its lowest position when the cancel string 25 is pulled.

Referring to FIGS. 3 and 5, clearance grooves 192 are located along each side edge of the aperture cards 41 – 45 and the release card 50. These grooves have a depth slightly greater than the side adjusting motion of the selector cards 46 – 49, to provide clearance for the adjusting strings 194, 195 shown in FIG. 2. String 194 passes through holes 196, 197 near the left edges of the front cover 11 and the rear main aperture plate 40 respectively. When slack, string 194 hangs in the space between the grooves 192 and the frame 10, and will be pressed against the frame 10 alongside the selector cards 46 – 49 if they are adjusted to the left. Pulling string 194 forces the selector cards to the right, to their alternate position or state. Similarly, string 195 may be used to force the selector cards back to the left state.

The selector cards described above provide two different patterns of relationship between the actuator string pulled and the window through which a symbol will be displayed. For example, when the adjusting string 194 has been pulled, forcing selector cards 46 – 49 to the right, pulling the sixth actuator string, which passes through selector slots 166 and actuating slots 86, will raise aperture cards 41 and 44 and selector card 47; this combination closes all identification ports except 106/146 over the sixth string, and all windows except the 12th (72/132). This state would be used when a picture panel 21 has been chosen having a symbol 20 in the 12th position matching the identification word 23 in the sixth position. For a subsequent teaching exercise, a picture panel may be chosen having the symbol 20 in the ninth position matching the identification word 23 in the sixth position; adjusting string 195 would then be pulled, forcing the selector cards 46 – 49 to the left. Pulling actuator string 16 in the sixth position will then raise aperture cards 41 and 44 and selector card 48, so only the correct symbol will remain in view.

As also shown in FIG. 2, it has been found advantageous to provide separator sheets 55 between the aperture cards and selector cards. The sheets may be of any material having moderate rigidity and a low friction surface; a transparent material such as cellophane eliminates the need for windows. To perform the function of preventing upward motion of one card from dragging an adjacent card upwards with it, the separator sheets must be locked in place. Pins 200, passing through the front cover 11, the separator 55, and the rear plate 40 at the lower corners of the sheets are a preferred locking method because of ease of assembly. As shown in FIGS. 2, 3, 4, and 5, small notches must be made at the lower corners of the aperture cards 41 – 45, the selector cards 46 – 49, and the release card 50 to permit free vertical movement of these cards.

In constructing a multi-window teaching device according to this invention, inexpensive easily process materials such as stiff paper or plastic sheet may be used. Die cutting the windows, slots and other openings in the cards and separators is a referred technique for high production. To provide longer life and protection to the picture panel and internal parts, the windows may be formed of a transparent material, rather than being punched holes. Many other forms of actuating means are also suitable, such as the insertion of a key through a hole or slot, or a slide pusher. Further, to eliminate the need for manually operating an adjusting means to obtain the benefit of multiple patterns of actuator vs. window selected, a groove or other keying arrangement may be provided in the picture panel, so that insertion of the panel automatically adjusts the selector cards to match the pattern of that position of the panel. In the embodiment shown, it is also preferable that the two sets of pictures shown on the panel 21, for use in the attitude shown and also inverted, have differing patterns of picture location; that is, one be arranged for use with the selector cards adjusted to the left, and the other for use adjusted to the right.

To provide teaching at a higher level of difficulty, this invention may also advantageously utilized with a far greater number of window positions, by using the maximum number of selection combinations possible with any given, but still small, number of aperture and selector cards.

Still other embodiments of this invention will be obvious to those skilled in the art, such as a rotary arrangement of the windows and the selection logic, without departing from the spirit of this invention.

What is claimed is:

1. A multi-window selective display apparatus comprising:
   a frame;
   a picture panel having a plurality of symbols depicted thereon arranged in a first predetermined pattern, having a plurality of identification means depicted thereon in a second predetermined pattern, individual ones of said identification means having a meaning associated with respective ones of said symbols;

means for holding said picture panel in a predetermined position with respect to said frame;

an aperture card slidably mounted in said frame for movement between at least a first and a second position, said card having a number of transparent window openings and a number of substantially opaque areas arranged in a third predetermined pattern;

a plurality of additional aperture cards similarly mounted in said frame, each card having transparent window openings and opaque areas arranged in different predetermined patterns;

a first actuator means, associated with the position of a first one of said identification means, for moving a first combination comprising at least one of said aperture cards from said first position to said second position so that the window openings of said cards are so aligned as to expose to view a predetermined number of said symbols related in a predetermined way to said first identification means, the other symbols being hidden by the opaque areas of the aperture cards; and a number of additional means, each associated with a different one of said identification means, for moving respective combinations of said cards from said first position to said second position such that respective combinations of said symbols are exposed to view and hidden.

2. An apparatus according to claim 1 wherein:

a first one of said aperture cards has an actuator opening of a first shape disposed so as to be operatively engaged by said first actuator means, and a plurality of actuator openings of a second shape disposed so as to be non-operatively engaged by others of said additional actuator means; and the others of said aperture cards have actuator openings of said first and second shapes disposed in different patterns for operative and non-operative engagement respectively by respective actuator means.

3. An apparatus according to claim 2 comprising in addition:

a cancelling member movably connected to said frame; and wherein each aperture card has a cancel opening for operative engagement with said cancelling member.

4. An apparatus according to claim 3 wherein:

said frame comprises a front cover plate having openings to receive said cancelling member and said plurality of actuator means and having transparent window openings aligned with the first predetermined pattern of said symbols, and a rear main aperture plate having transparent window openings aligned with those in the front cover plate and having additional openings for receiving the cancelling member and the plurality of actuator means; and said cancelling member and said plurality of actuator means are each comprised of a string threaded through the respective openings of the rear main plate, the aperture cards and the front cover, and fastened behind the rear main plate, so that pulling an actuator string through the front cover opening will move at least one aperture card from said first position to said second position, and pulling the cancel string through the front cover moves all the aperture cards to the first position.

5. An apparatus according to claim 1 wherein:

the number of aperture cards is less than the number of symbols;

each aperture card has a pattern of openings which will expose a plurality of symbols when that card only is in the second position; and respective combinations of at least two of said cards are moved from said first position to said second position in response to operation of respective actuator means, so that the number of such combinations of exposed symbols is greater than the number of aperture cards.

6. An apparatus according to claim 5 wherein:

said first combination of aperture cards exposes a first plurality of said symbols to view when moved to said second position, said first plurality including at least one symbol having a meaning not associated with said first one of said identification means; and said apparatus comprises in addition:

a selector card slidably mounted in said frame for movement between at least a first and a second position, having a plurality of transparent window openings and a number of substantially opaque areas arranged in a fourth predetermined pattern so aligned that, when the selector card and said first combination of aperture cards are in said second position, an opaque area of said selector card is aligned with said symbol having a meaning not associated, thereby hiding said symbol from view;

means for selectively adjusting said selector card from a first state to a second state, such that in said first state said selector card is non-responsive to operation of said first actuator means, in said second state said selector card is responsive to operation of said first actuator means; and a plurality of removable picture panels of at least a first and second pattern type, said first pattern type arranged so that correct association of identification means, actuator means and exposed symbols can be obtained only when said selector card is adjusted to said first state, said second pattern type arranged so that correct association of identification means, actuator means and exposed symbols can be obtained only when said selector card is adjusted to said second state.

7. An apparatus according to claim 6 wherein:

said selector card has a selector opening of a shape so disposed that said opening will accept said first actuator means non-responsively to operation of said actuator means when said selector card is in said first state, and said opening will engage said first actuator means so as to be moved from said first position to said second position responsively to operation of said actuator means when said selector card is in said second state.

8. An apparatus according to claim 7 wherein:

said selector card is adjusted from said first state to said second state by sliding movement along a direction perpendicular to the movement from said first position to said second position.

* * * * *